(12) United States Patent
Yuen

(10) Patent No.: US 7,179,425 B2
(45) Date of Patent: Feb. 20, 2007

(54) CYLINDRICAL OPTOELECTRONIC AIR CLEANER

(76) Inventor: Se Kit Yuen, 6/F., Yau Lee Centre, 45 Hoi Yuen Road, Kwun Tong, Kowloon (HK)

( * ) Notice: Subject to any disclaimer, the term of this patent is extended or adjusted under 35 U.S.C. 154(b) by 291 days.

(21) Appl. No.: 10/698,440

(22) Filed: Nov. 3, 2003

(65) Prior Publication Data

US 2004/0241054 A1    Dec. 2, 2004

(30) Foreign Application Priority Data

May 27, 2003    (CN)    ................... 03 2 63745

(51) Int. Cl.
*A61L 9/20*    (2006.01)
*B03C 3/016*    (2006.01)

(52) U.S. Cl. ................ 422/121; 96/223; 96/224
(58) Field of Classification Search ........... 96/223, 96/224; 422/121
See application file for complete search history.

(56) References Cited

U.S. PATENT DOCUMENTS 6,494,940 B1 *    12/2002    Hak .................... 96/224
6,911,186 B2 *    6/2005    Taylor et al. .......... 422/186.07

FOREIGN PATENT DOCUMENTS

GB    2301179 A    * 11/1996

* cited by examiner

*Primary Examiner*—Krisanne Jastrzab
*Assistant Examiner*—Sean Conley
(74) *Attorney, Agent, or Firm*—Sughrue Mion, PLLC

(57) ABSTRACT

The present invention relates to an air cleaner for killing the bacteria, viruses, mildew in the air with optoelectronic. A draft fan in the main body is used to suck the air. The air is then collected in an air collecting device after passing through an air collecting wall. An extreme ultraviolet ray transmitting tube is used to eliminate the bacteria, viruses, mildew in the air, and thereafter, the cleaned air is disposed by a negative ion cleaner. The fresh air is finally discharged through an air outlet.

3 Claims, 8 Drawing Sheets

CYLINDRICAL OPTOELECTRONIC AIR CLEANER

TECHNICAL FIELD

The present invention relates to an optoelectronic air cleaner, more particularly, to an optoelectronic air cleaner having a main body of cylindrical shape, which cleans the air and kills the bacteria, viruses, mildew and the like in the air with extreme ultraviolet ray and negative ion.

BACKGROUND OF THE INVENTION

Air cleaning is necessary in the case that the air stagnancy occurs when the air conditioning device or the heating device is used in the room during the summer and winter periods, especially in large public places where people are gathering. In particular, since SARS spread through the world, people show more and more concerns about the air cleaning in the room. In order to clean the air in the room, not only should the fresh air be introduced into the room, but also should the bacteria, viruses, mildew and the like in the air be killed. Currently, a typical way of air cleaning includes a conventional air cleaner which produces negative ion by high voltage ionization. Some air conditioners have such kind of air cleaning unit. Besides, the ultraviolet sterilizing lamp used in hospitals can effectively kill the germina in the air. These two methods for air cleaning both have their respective advantages, but also have obvious disadvantages. For example, the negative oxyanion has a poor sterilizing effect, and the ultraviolet lamp can not be used for a long time and will hurt the human body when it irradiates on the body. Furthermore, conventional ventilation devices and air conditioning devices do not have air cleaning function, instead, they generally only have dust filtering devices. In addition, the cost for replacing the whole device is very high.

SUMMARY OF THE INVENTION

An object of the present invention is to overcome the disadvantages of the prior art by providing a cylindrical optoelectronic air cleaner, which can efficiently clean the air by the combination of the ultraviolet ray and the negative ion. Therefore, it can provide the user with fresh and clean air at any time and any place.

The object of the present invention is achieved by the following technical solution.

A cylindrical optoelectronic air cleaner comprising a main body of cylindrical shape which has a draft fan, a transformer, a circuit board, an extreme ultraviolet ray tube and a cathode high voltage discharge fiber thread therein, characterized in that the main body is provided with an air inlet and an air outlet, the air outlet being disposed on the front end of the main body, an air exhaust gridiron being disposed in the front surface of a curved plate fixed on the front gridiron on the front end of the main body; the air inlet being disposed in the rear end of the main body and having an air input gridiron provided with a dustproof gridiron, a dust screen and a dust cover for the air inlet; a draft fan fixing cover, a draft fan and a fixing frame being provided adjacent to the inner surface of the air exhaust gridiron; a carbon fiber thread being fixed to the center of the front surface of the air exhaust gridiron; an air collecting device being disposed between the air inlet and the draft fan; and an extreme ultraviolet ray tube being disposed at the center of the air collecting device.

Furthermore, the cylindrical optoelectronic air cleaner is characterized in that the air collecting device is defined by the space enclosed by the air collecting wall and the shield wall, and the extreme ultraviolet ray tube is fixed between the front and the rear shield wall so that the ultraviolet ray would not radiate outside the cleaner.

Still furthermore, the cylindrical optoelectronic air cleaner is characterized that the main body is provided with a supporting frame therein, and a fixing protection cover is connected to the top end of the supporting frame, the protection cover being provided with an electronic converter on the top end thereof and a power supply electronic generator and a transformer therein.

The invention has the following advantages: the cylindrical optoelectronic air cleaner can kill the bacteria, viruses, mildew and the like in the air by utilizing the extreme ultraviolet ray while adding negative ions into the environment; when the air is drawn into the cylindrical optoelectronic air cleaner by the fan, there are two operation ways which alternate continuously and repeatedly. That is to say, the ultraviolet ray radiation and the high voltage ionization of negative ion work alternatively and automatically to achieve ideal air cleaning effect.

DESCRIPTION OF THE PREFERRED EMBODIMENTS

The technical solution of the present invention will be described in detail by way of examples in conjunction with the accompanying drawings.

The cylindrical optoelectronic air cleaner according to the present invention includes: a fan, an extreme ultraviolet ray transmitting tube and a cathode high voltage discharging fiber. There are two operation ways which alternate continuously and repeatedly after the air is drawn into the cylindrical optoelectronic air cleaner. One way is that the intermittent cathode output (about 3 to 4 minutes) with high voltage discharges via carbonized fiber thread to ionize the air and produce negative ion to be exhausted by the fan. The other way is to intermittently ignite the extreme ultraviolet ray (about 7 to 10 minutes) to reduce the bacteria, viruses, mildew and the like in the air. The cylindrical optoelectronic air cleaner is provided with an air inlet and an air outlet. The cathode high voltage fiber is fixed within the air outlet and the extreme ultraviolet ray transmitting tube is fixed within the said air outlet. While the fan is fixed within the main body. The air is sucked into the main body via the air inlet to make the moving air easily enter and pass through an electronic gridiron for killing bacteria, viruses, mildew to reach the air outlet gridiron, so that the air is made to contact the extreme ultraviolet ray transmitting tube, in which the extreme ultraviolet ray kill the bacteria, viruses, mildew and the like. The air then is further cleaned by the negative ion generating unit. Finally, the fresh air containing negative ion is discharged from the air outlet. By this way, the air quality in the room can be improved.

The main body is of cylindrical external shape, other features of the invention will be explained in detail in the following description.

Figure 1:
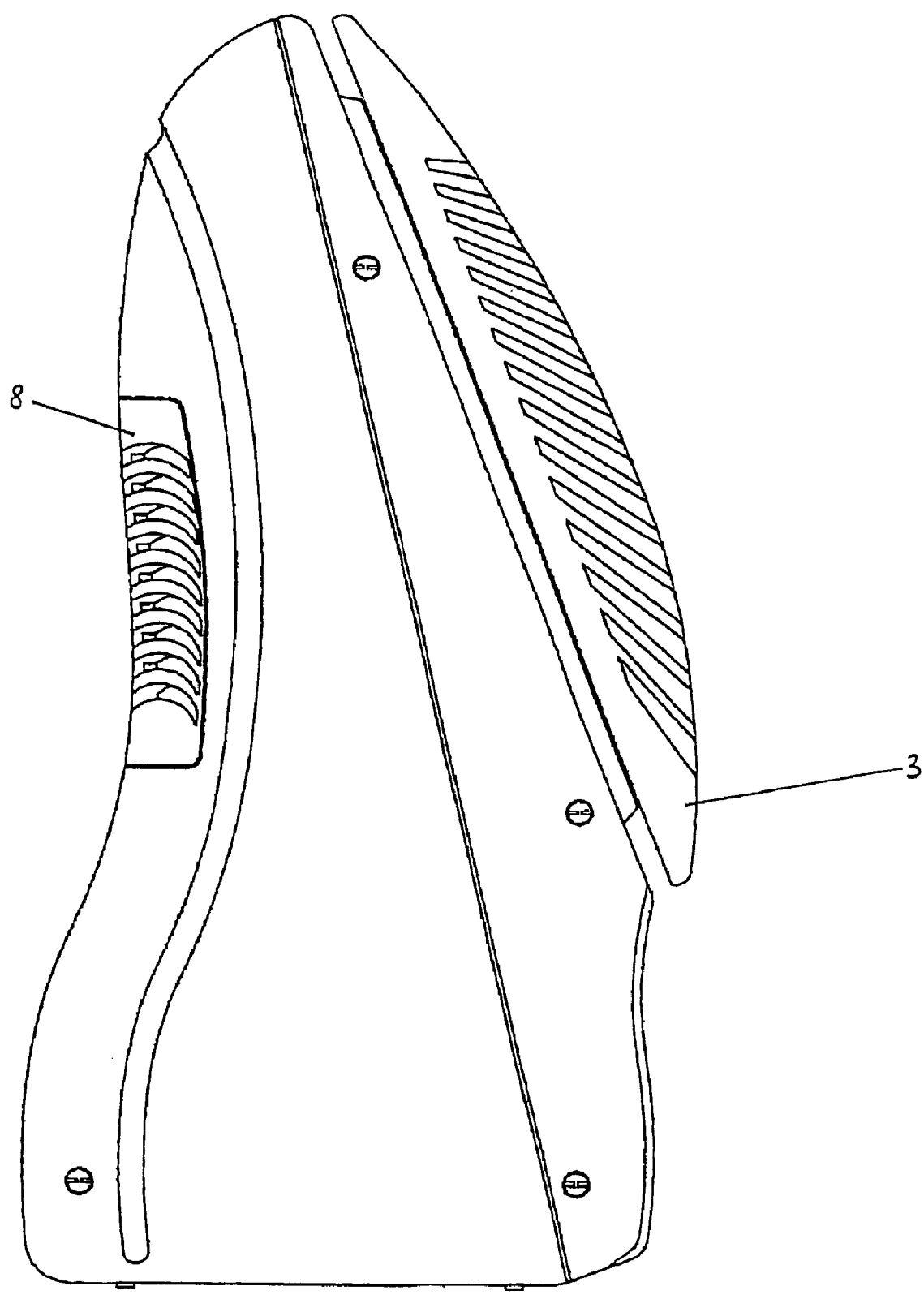
FIG. 1 is a side view showing the external shape of the product according to the present invention.
Figure 2:
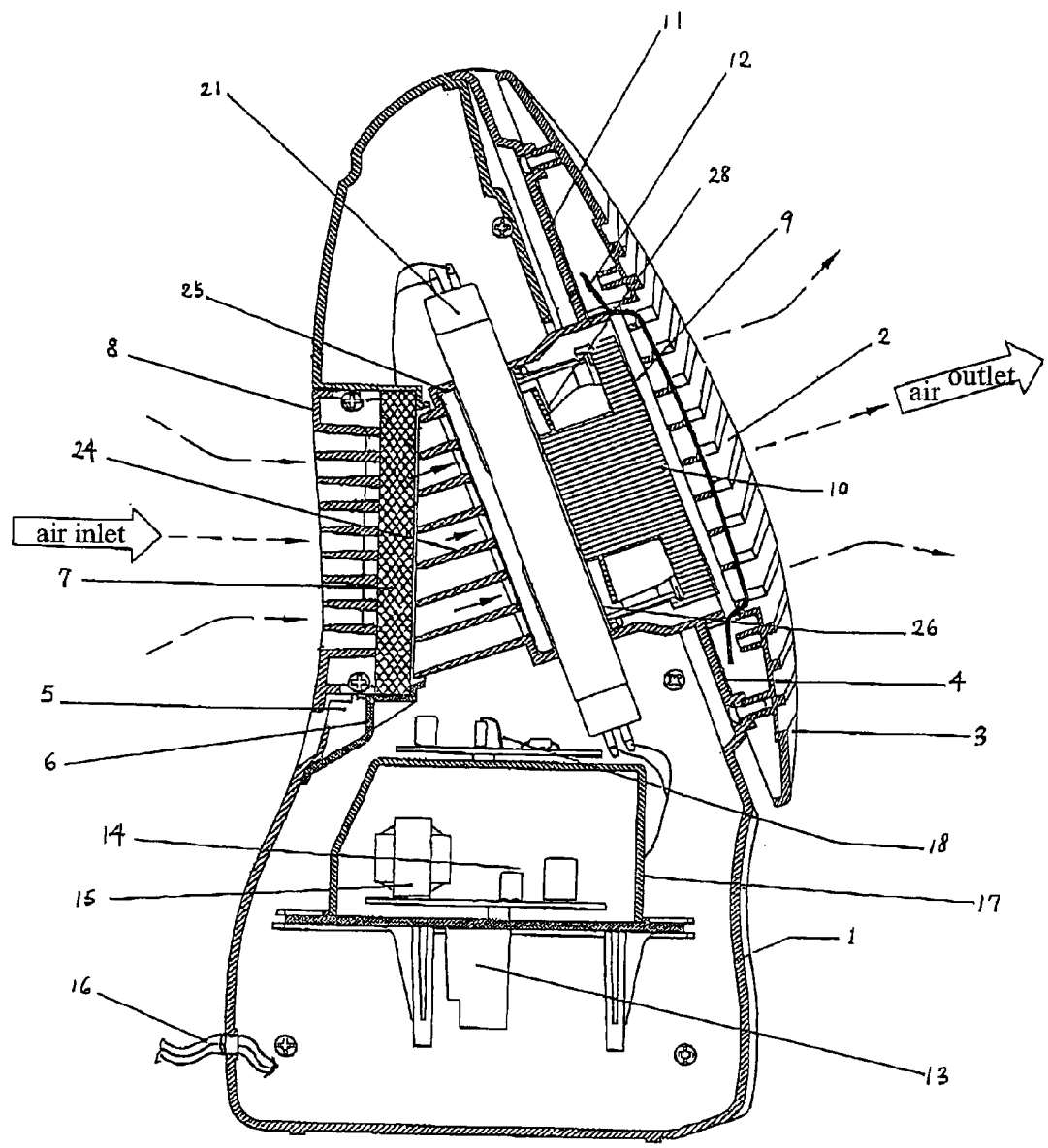
FIG. 2 is a longitudinal sectional view of the product showing in FIG. 1.
Figure 3:
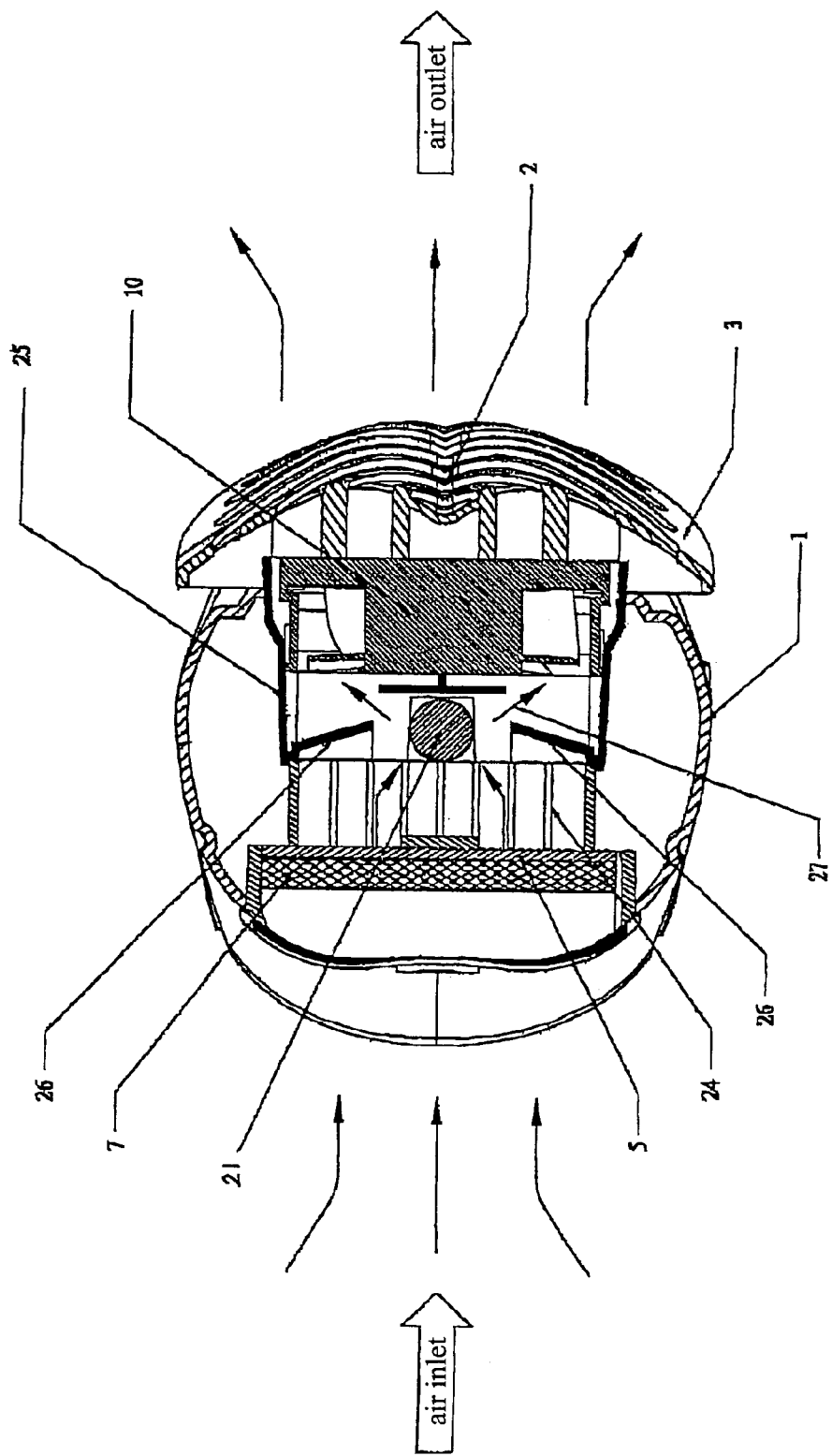
FIG. 3 is a cross sectional view of the product showing in FIG. 1.
Figure 4:
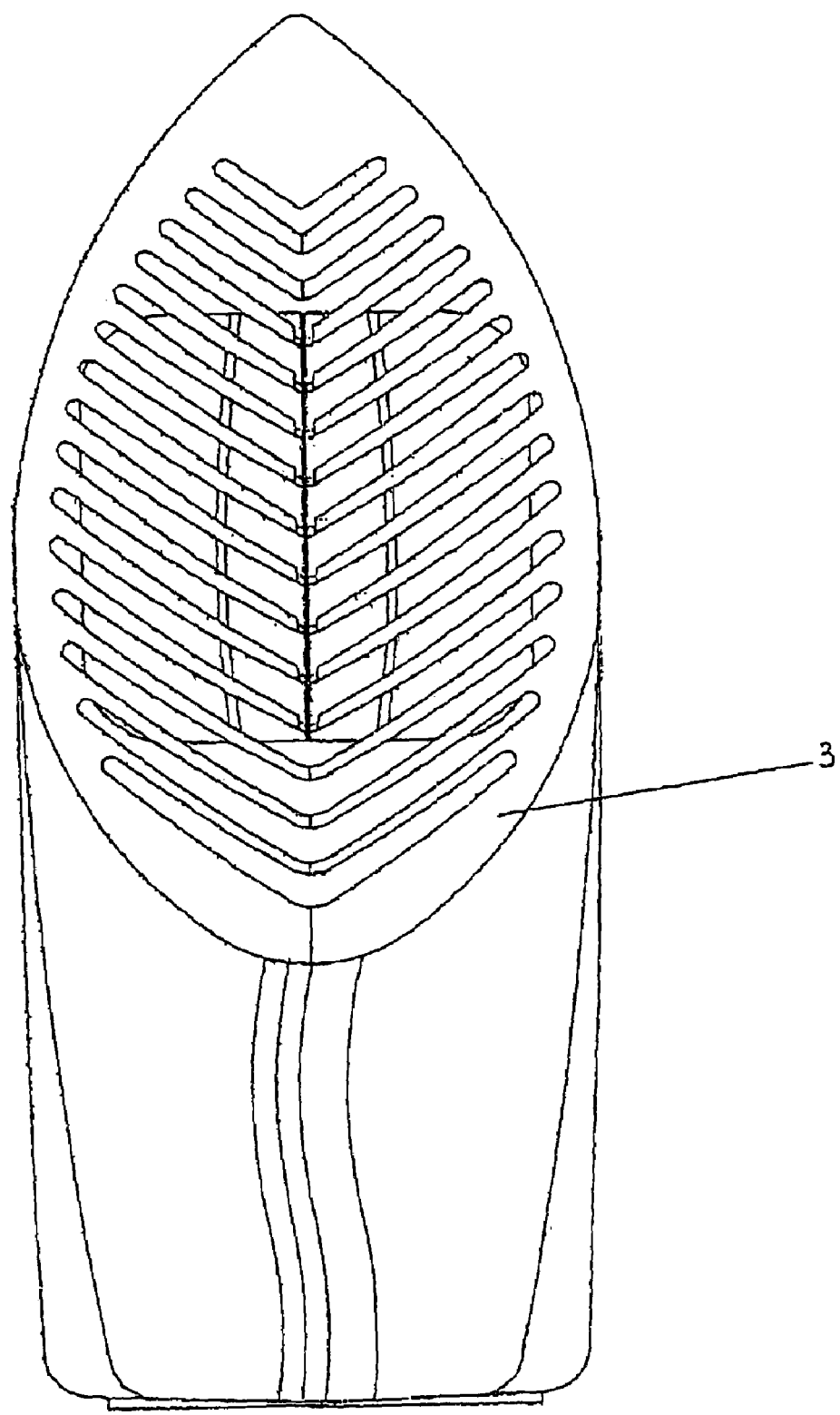
FIG. 4 is an elevation view of the product showing in FIG. 1.
Figure 5:
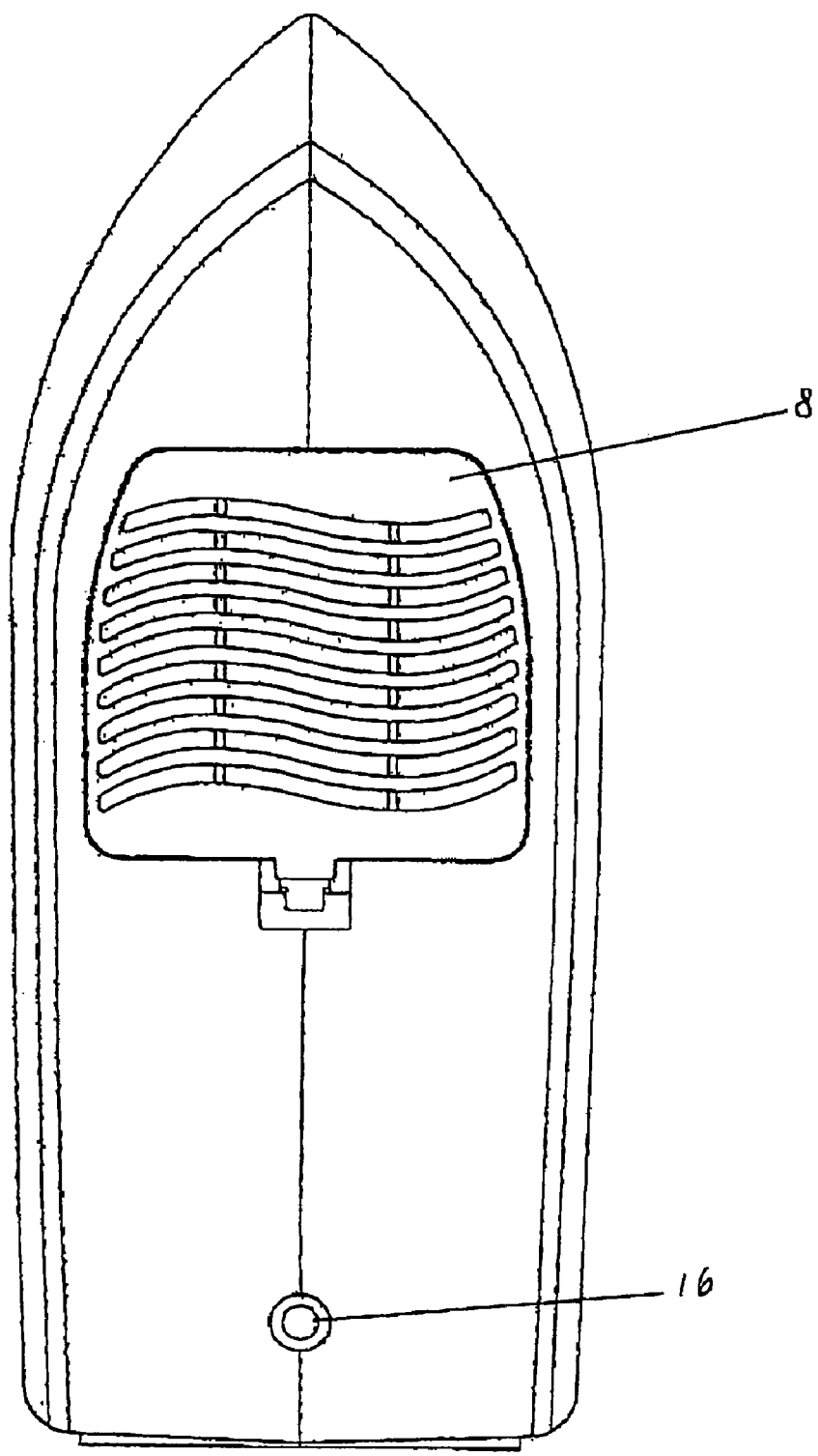
FIG. 5 is a back view of the product showing in FIG. 1.
Figure 6:
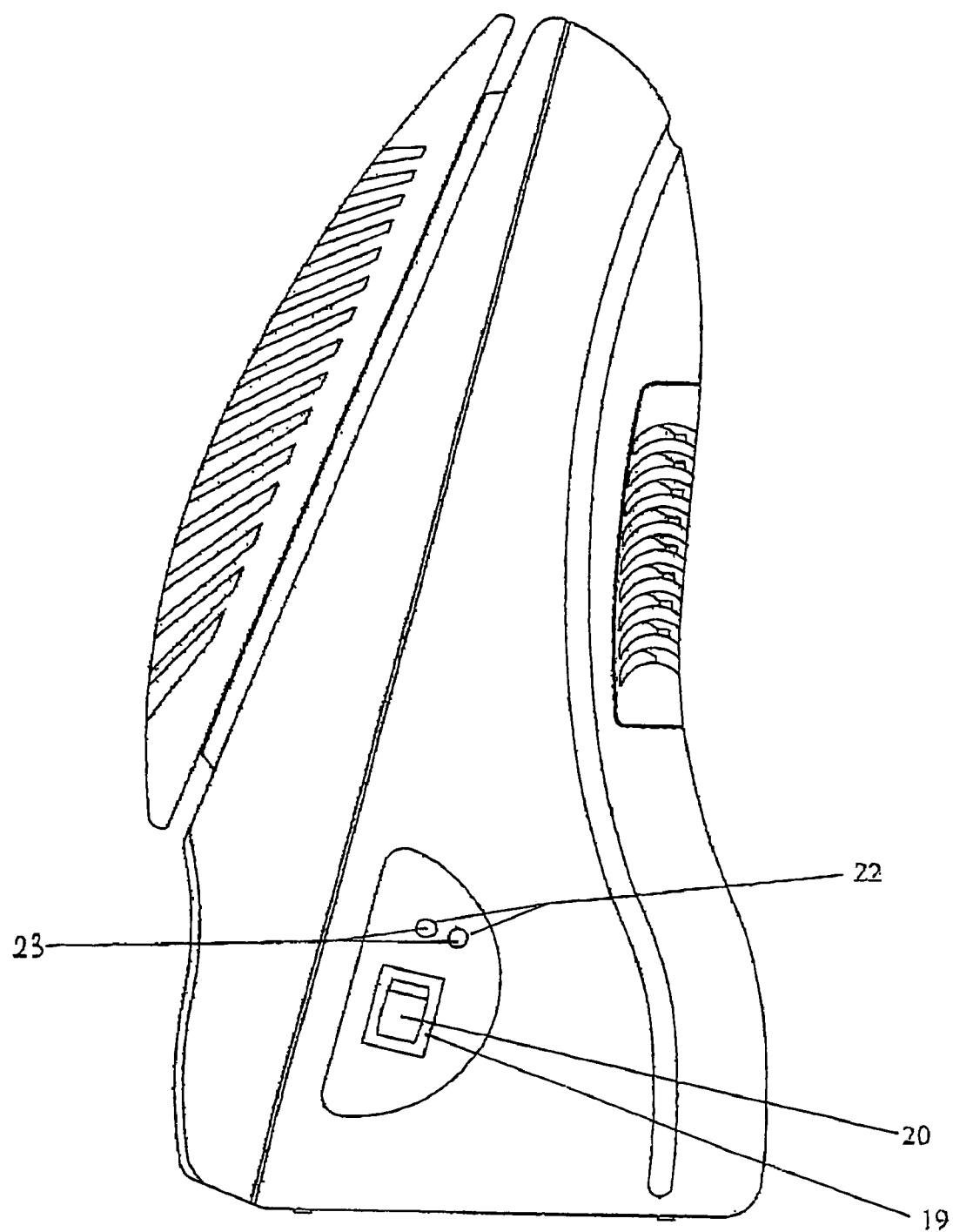
FIG. 6 is another side view of the product showing in FIG. 1.
Figure 7:
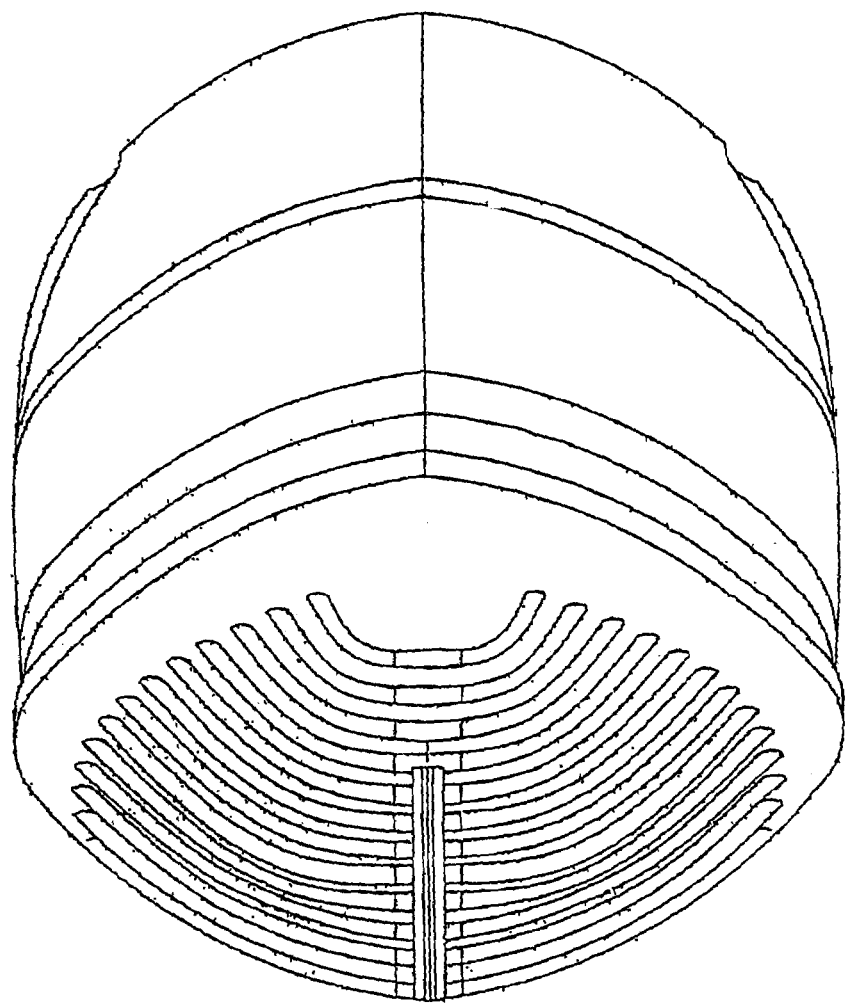
FIG. 7 is an upward view of the product showing in FIG. 1.
Figure 8:
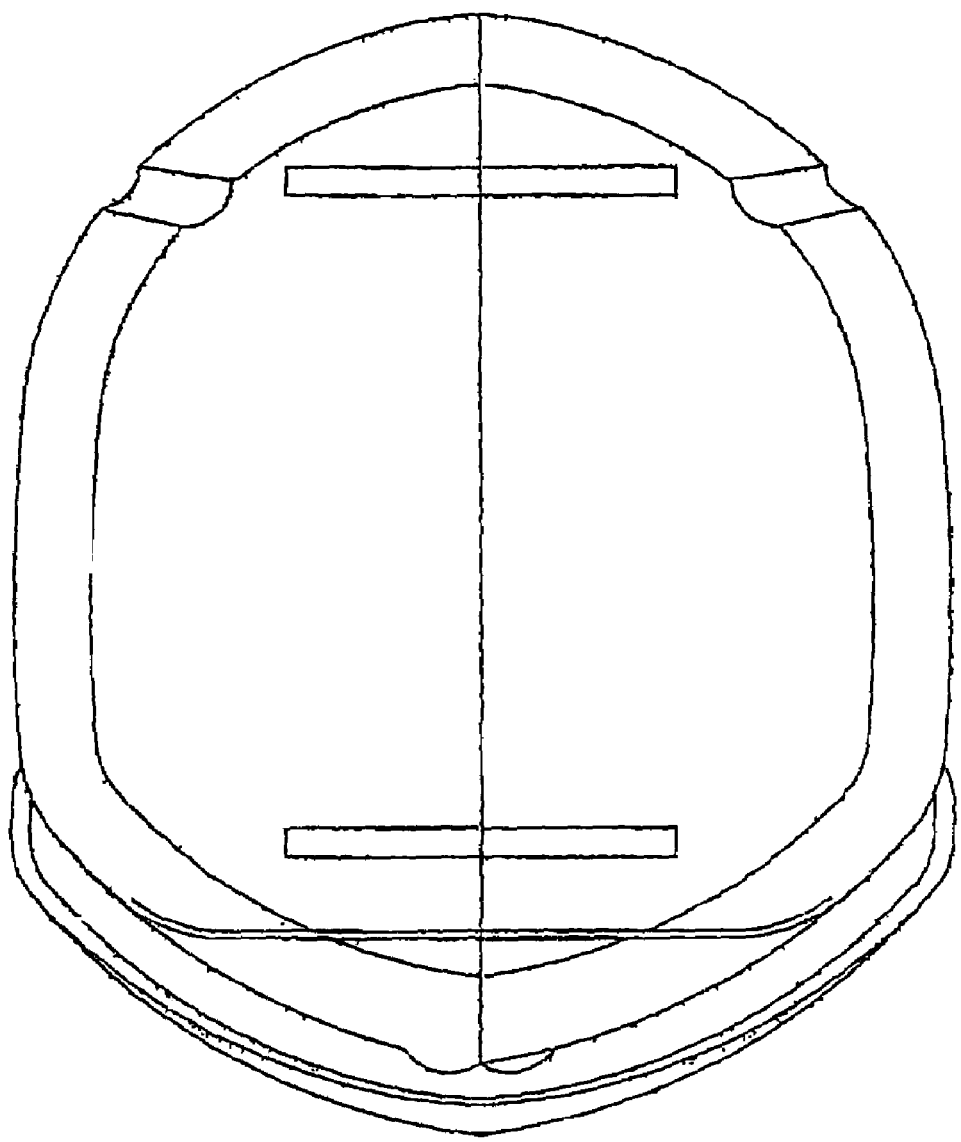
FIG. 8 is a bottom view of the product showing in FIG. 1.

The detailed structure of the cylindrical optoelectronic air cleaner is shown in FIG. 2 and FIG. 3. The cylindrical optoelectronic air cleaner comprises a main body 1 with cylindrical shape. An air exhaust gridiron 2 is disposed in the front surface of the curved plate 3 which is fixed on the front gridiron 4 on the front end of the body 1.

The ionized air is exhausted via the air exhaust gridiron 2.

There is an air input gridiron 5 on the rear end of the main body 1. The air input gridiron 5 is provided with a dustproof gridiron 6, a dust screen 7 and a dust cover 8 for the air inlet. A draft fan fixing cover 9, a draft fan 10 and a fixing frame 11 are attached to the inner surface of the air exhaust gridiron 2. A carbon fiber thread 12 is fixed to the center of the front surface of the air exhaust gridiron 2 to ionize the air under a condition of cathode high voltage.

A supporting frame 13 provides positions for fixing a power supply electronic generating unit 14, a transformer 15 and a power supply wire 16. The top end of the supporting frame 13 is connected to a fixing protection cover 17 which is used for protecting the power supply electronic generating unit 14 from being damaged by high voltage electric shock. An electronic converter 18 is provided on the top end of the protection cover 17.

There is a rectangular hole 19 on the side surface of the main body 1 for fixing a switch 20 which controls the function of the draft fan 10, the extreme ultraviolet ray transmitting tube 21 and carbon fiber thread 12. There are two holes 22 in the plane over the switch 20 for fixing two LEDs (light-emitting diode) 23 with different color for the use of function indicating.

In practical application, when the cylindrical optoelectronic air cleaner is operated, the draft fan 10 sucks the air containing bacteria, viruses, mildew and the like. The sucked air moves into the air collecting device 25 within the main body 1 via the dust screen 7. The collecting device 25 has a plurality of stripe-like gridirons 24 at the rear end thereof so that the moving air can easily enter and pass through the air collecting device 25 to reach the air exhaust gridiron 2. The extreme ultraviolet rays transmitting tube 21 is disposed at the center of the air collecting device 25. In other words, the air containing bacteria, viruses, mildew and the like firstly moves in the air collecting wall 26 on the both sides of the air collecting device 25, and then proceeds into the air input ports 27 disposed between the extreme ultraviolet ray transmitting tube 21 and the air collecting walls 26. When the air containing bacteria, viruses, mildew and the like moves into the air input port 27, the extreme ultraviolet ray transmitting tube 21 emits extreme ultraviolet rays to eliminate the bacteria, viruses, mildew and the like in the air. Thereafter, the cleaned air is discharged toward the cathode high voltage carbon fiber thread 12 of the air exhaust gridiron 2 by the draft fan 10 to be further cleaned by the negative ions. The fresh air containing negative ions is then discharged from the air exhaust gridiron 2 so that the indoor air quality is improved.

The said air collecting device 25 has shield walls 28 in the both front and rear sides, which prevent the extreme ultraviolet rays from emitting outside of the main body to protect the eyes of the user.

The circuitry of the cylindrical optoelectronic air cleaner is: the input municipal power supply arrives the negative ions high voltage generating circuit via the switch 20 to provide a negative high voltage output. The input power supply also provides electric power through a full wave rectifier circuit and supplies to the draft fan 10 via a speed control circuit and it operates the full wave rectifier circuit of the extreme ultraviolet rays transmitting tube 21 via a DC-to-AC circuit. Another circuit supplies power to the automatic circulating control circuit for the negative ions generating circuit/the activating circuit of the extreme ultraviolet rays transmitting tube 21 via DC voltage stabilizing circuit, so as to control the alternative operations of the negative ions generating device and the extreme ultraviolet rays transmitting tube 21.

The structure and specific connection relation of the electronic circuit of the present invention have been published in the inventor's previous application, therefore, the description of which is omitted herein.

The negative ions produced by the negative ion generating device can promote the biochemical process (increasing the negative ions inbreathed when breathing) and reduce the hormonal secretion which can make human depressed and tired.

The cylindrical optoelectronic air cleaner according to the present invention, with the extreme ultraviolet rays transmitting tube producing extreme ultraviolet rays with wavelength of 253.7 nanometer, can eliminate the bacteria, viruses, mildew in the air.

In the modern society, air conditioning devices have become one of the necessary devices in most of families, hospitals, homes for the aged, department stores, cinemas, restaurants, offices, manufacturing shops as well as the elevators, automobiles of large, middle and small size, steamships, airplanes and trains. The cleaning function of the cylindrical optoelectronic air cleaner improves the environment of human's living, inhabiting, medical treatment, working, consuming and riding on the transportation and the like, and returns human a clean space in the modern society with the natural environment of which has been damaged increasingly.

The above is just a description of the technical solution and embodiments of the invention, but not for limiting the solution. It is obvious that a lot of modifications and changes can be made to practice the present invention by the people skilled in the art within the spirit and principle defined by the appended claims of the present invention.

What is claimed is:

1. A cylindrical optoelectronic air cleaner comprising a main body of cylindrical shape, the main body including a draft fan, a transformer, a circuit board, an outer spectrum ultraviolet ray tube and a cathode high voltage discharge fiber thread therein, characterized in that the main body is provided with an air inlet and an air outlet, the air outlet being disposed on the front end of the main body, an air exhaust gridiron being disposed in the front surface of a curved plate fixed on a front gridiron on the front end of the main body; the air inlet being disposed on the rear end of the main body and having an air input gridiron provided with a dustproof gridiron, a dust screen and a dust cover for the air inlet; a draft fan fixing cover, the draft fan and a fixing frame being provided adjacent to the inner surface of the air exhaust gridiron; the carbon fiber thread being fixed to the center of the front surface of the air exhaust gridiron; an air collecting device being disposed between the air inlet and the draft fan, said air collecting device comprising a plurality of parallel stripe-like gridirons disposed in the direction of air flow and extending from said input grid toward said draft fan; and the outer spectrum ultraviolet ray tube being disposed at the center interior of the air collecting device between the draft fan and the stripe-like gridirons and shielded against viewing by a user.

2. The cylindrical optoelectronic air cleaner according to claim 1, wherein the air collecting device is defined by the space enclosed by an air collecting wall and a shield wall, and the outer spectrum ultraviolet ray tube is fixed between a front and a rear shield wall so that the ultraviolet ray would not radiate outside the cleaner.

3. A cylindrical optoelectronic air cleaner comprising a main body of cylindrical shape, the main body including a draft fan, a transformer, a circuit board, an outer spectrum ultraviolet ray tube and a cathode high voltage discharge fiber thread therein, characterized in that the main body is provided with an air inlet and an air outlet, the air outlet being disposed on the front end of the main body, an air exhaust gridiron being disposed in the front surface of a curved plate fixed on a front gridiron on the front end of the main body; the air inlet being disposed on the rear end of the main body and having an air input gridiron provided with a dustproof gridiron, a dust screen and a dust cover for the air inlet; a draft fan fixing cover, the draft fan and a fixing frame being provided adjacent to the inner surface of the air exhaust gridiron; the carbon fiber thread being fixed to the center of the front surface of the air exhaust gridiron; an air collecting device being disposed between the air inlet and the draft fan; and an outer spectrum ultraviolet ray tube being disposed at the center of the air collecting device, wherein the air collecting device is defined by the space enclosed by an air collecting wall and a shield wall, and the outer spectrum ultraviolet ray tube is fixed between a front and a rear shield wall so that the outer spectrum ultraviolet ray would not radiate outside the cleaner, and wherein the main body is provided with a supporting frame therein and a fixing protection cover is connected to the top end of the supporting frame, an electronic converter being provided on the top end of the protection cover and a power supply electronic generator and a transformer being provided within the protection cover.

* * * * *